US005285728A

United States Patent [19]

Dolivet

[11] Patent Number: 5,285,728

[45] Date of Patent: Feb. 15, 1994

[54] SUCCESSIVE-ACTUATION DEVICE, USING PYROTECHNIC CORD

[75] Inventor: Alain Dolivet, Chatenay Malabry, France

[73] Assignee: Societe Anonyme dite: Aerospatiale Societe Nationale Industrielle, Paris, France

[21] Appl. No.: 985,292

[22] Filed: Dec. 4, 1992

[30] Foreign Application Priority Data

Dec. 6, 1991 [FR] France ................................ 91 15151

[51] Int. Cl.[5] ............................ C06C 5/04; F03G 7/06

[52] U.S. Cl. ................................ 102/275.1; 102/205; 102/275.8

[58] Field of Search ............... 102/275.8, 275.1, 275.6, 102/200, 205

[56] References Cited

U.S. PATENT DOCUMENTS

| | | | |
|---|---|---|---|
| 3,483,360 | 12/1969 | Perry | 219/512 |
| 4,011,816 | 3/1977 | Smith et al. | 102/275.8 |
| 4,328,752 | 5/1982 | Jander | 102/205 |
| 4,551,974 | 11/1985 | Yaeger et al. | 60/527 |
| 5,010,821 | 4/1991 | Blain | 102/275.8 |
| 5,070,788 | 12/1991 | Carisella et al. | 102/275.7 |

FOREIGN PATENT DOCUMENTS

| | | |
|---|---|---|
| 0296053 | 12/1988 | European Pat. Off. . |
| 3637102 | 5/1988 | Fed. Rep. of Germany .. |

*Primary Examiner*—David H. Brown
*Attorney, Agent, or Firm*—Marshall, O'Toole, Gerstein, Murray & Borun

[57] ABSTRACT

The invention relates to a successive-actuation device of the type including at least one pyrotechnic cord and a trigger for actuating the operation thereof. Advantageously, the invention contains at least one element made from a shape-memory alloy having two stable states and disposed along the pyrotechnic cord, the element being capable of actuating a subsequent operation when it passes from one of its two stable states, for which the element occupies a neutral position, to its other stable state for which is occupies an active position, under the action of the heat generated by the pyrotechnic cord after triggering.

10 Claims, 3 Drawing Sheets

SUCCESSIVE-ACTUATION DEVICE, USING PYROTECHNIC CORD

The present invention relates to a successive-actuation device.

More particularly, the purpose of the device is to actuate at least one operation or one technical function, using a pyrotechnic cord, the firing of which is obtained by appropriate triggering means.

For this purpose, the successive-actuation device, of the type including at least one pyrotechnic cord and means for triggering the operating of said pyrotechnic cord, is noteworthy, according to the invention, in that it comprises at least one element made from a shape-memory alloy having two stable states and disposed along said pyrotechnic cord, said element being capable of actuating a subsequent operation when it passes from one of its two stable states, for which the element occupies a neutral position, toward its other stable state for which it occupies an active position, under the action of the heat released by said pyrotechnic cord following the triggering of the latter.

Thus, the thermal energy generated by the pyrotechnic cord is used in order to cause the change of state of the element made from a shape-memory alloy and then to actuate a subsequent operation which may be a mechanical, electrical or other type of operation.

In fact, it is known that shape-memory alloys have the special feature of possessing, in the solid state, two stable crystalline structures (one in an austenitic phase, the other in a martensitic phase) respectively in two different temperature ranges, each of which corresponds to a specific phase of the crystalline structure of the alloy and which are separated by an intermediate zone called the transition-temperature zone. Thus, depending on the temperature, the part made from such an alloy can adopt two distinct configurations which are stable, in a reversible manner. By way of example, these alloys are metallic, of the nickel-titanium or copper-zinc-aluminum type, depending on the applications.

In order to obtain a part having these properties from such an alloy, the process consists, for example, in producing the part in a first shape when its crystalline structure is in the austenitic phase, in the temperature range corresponding to this phase, in cooling the part, by crossing the transition-temperature zone, until its temperature range corresponding to its martensitic phase and in applying to it a stress specific for imparting a second shape to it. After returning to ambient temperature, the part keeps this second shape and its mechanical characteristics are restored. A rise in temperature above the transition zone enables the part to pass from its second shape to its initial, first state.

In a first embodiment, said element made from a shape-memory alloy acts, when it passes toward its stable state corresponding to its active position, on electrical contact means which allow the actuation of the subsequent operation. Thus, the deformation of the element produced by its change of state may serve, in this case, to establish the electrical connection in an appropriate circuit and to trigger said operation.

In a second embodiment, said element made from a shape-memory alloy acts, when it passes toward its stable state corresponding to its active position, on mechanical means which allow the actuation of the subsequent operation. In this case, said element can release, after its change of state and thus shape, a mechanical device.

Advantageously, a plurality of elements made from shape-memory alloy are disposed, in a spaced-apart manner, along said pyrotechnic cord, in order for each to actuate a subsequent operation, when they pass successively toward their active position under the action of heat released progressively by said pyrotechnic cord. A device is thus created making it possible to actuate, using a pyrotechnic cord, a chain reaction of subsequent technical operations which are mechanical, electrical or of another kind, at precise moments in time, depending on the nature of the chemical composition of the cord and on the cord length to be used from its start as far as the various elements.

In a preferred embodiment, said element is in the form of a strip in contact with said pyrotechnic cord. Furthermore, the transverse cross section of said strip is polygonal. The extreme simplicity of construction of said strips is thus noted.

Said pyrotechnic cord is preferably housed in a recess of a part, in which recess said element made from shape-memory alloy is also arranged. More particularly, said element is disposed between the bottom of said recess and said pyrotechnic cord.

Moreover, said means for triggering said pyrotechnic cord may comprise an electrical power supply connected to a chemical priming composition in contact with a chemical heating composition connected to said pyrotechnic cord. As regards the pyrotechnic cord, it is of the delay type and is constituted by a slow-fusing chemical composition contained in a metal sheath.

The figures of the attached drawing will make it easy to understand how the invention may be produced. In these figures, identical references designate similar elements.

Figure 1:
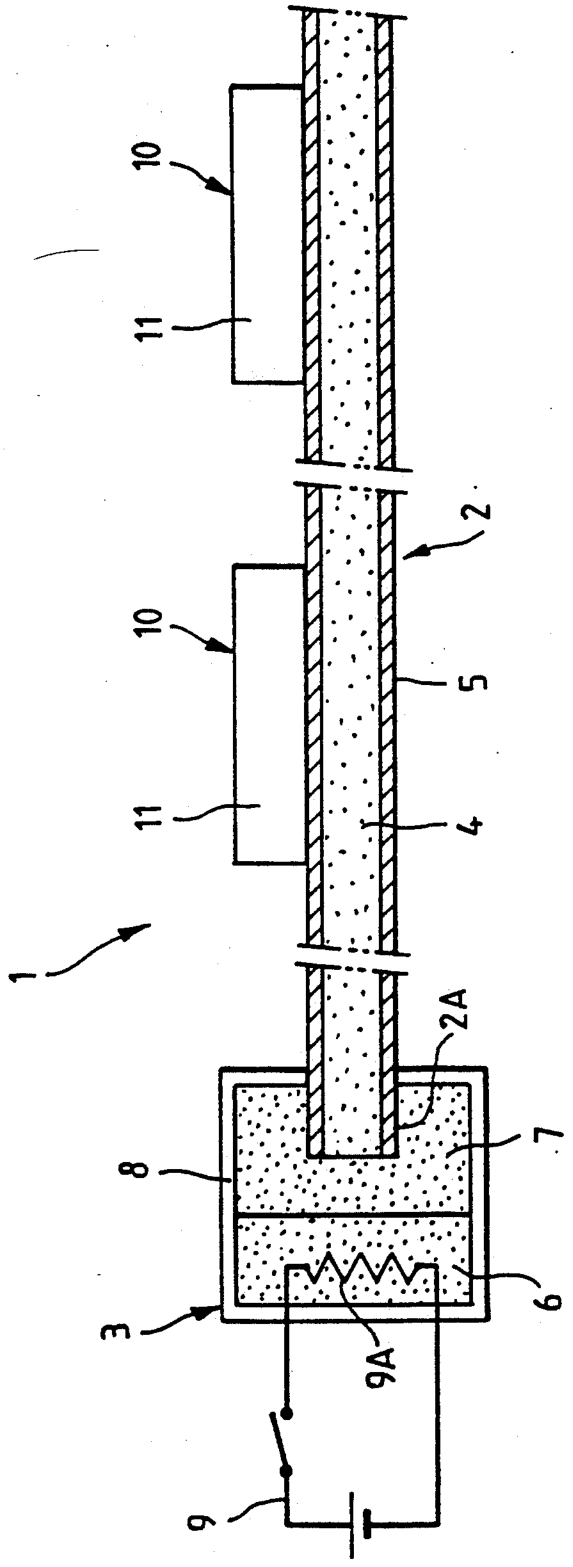
FIG. 1 represents a diagrammatic view of the actuation device in accordance with the invention.

The actuation device 1, illustrated diagrammatically in FIG. 1, includes a pyrotechnic cord 2 and means 3 for triggering the operating of said cord. In this particular embodiment example of said device, the pyrotechnic cord 2 is of the "delay" type, so that it is constituted by a slow-fusing chemical composition 4 known per se and surrounded by a sheath 5. The latter is preferably metallic in nature, made, for example, from tin or from lead or from a similar material having a low melting point.

The triggering means 3 are especially defined by a chemical priming composition 6 and by a heating chemical composition 7 which are disposed side by side inside a casing 8. The priming composition 6 is moreover traversed by a filament 9A of an electrical power-supply circuit 9 actuated externally, whereas the upstream end 2A of the pyrotechnic cord 2 is engaged in the heating composition 7.

As a result, switching on the electrical power-supply circuit 9 causes the heating of the filament 9A, which leads to the firing of the priming composition 6 which itself produces the ignition of the heating composition 7. The latter ensures, in turn, the firing of the slow-fusing composition 4 of said pyrotechnic cord. Of course, any other type of means 3 could be envisaged for actuating the ignition of said cord.

According to the invention, the device 1 comprises a plurality of elements 10 made from a shape-memory alloy having two stable states and disposed, in a spaced-apart manner with respect to each other, along the pyrotechnic cord 2. By way of example, two elements 10 have been represented in FIG. 1, these being in contact with the sheath 5 of said cord. These elements 10, made from a shape-memory alloy, have the purpose of actuating subsequent operations respectively and successively when they pass from one stable state to the other, as explained previously, under the action of the heat generated, in the present case, by the combustion of said pyrotechnic cord 2.

Figure 2:
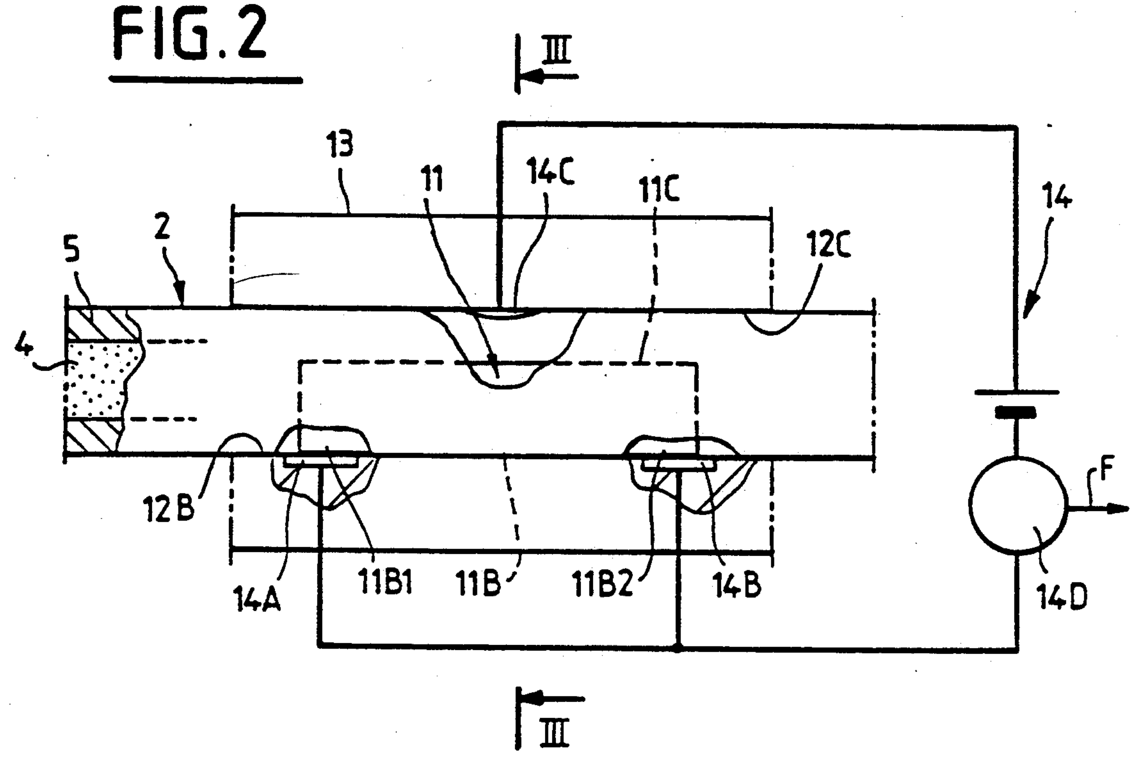
FIG. 2 shows a particular example for mounting on a part said device whose element made of shape-memory alloy occupies a neutral position.
Figure 3:
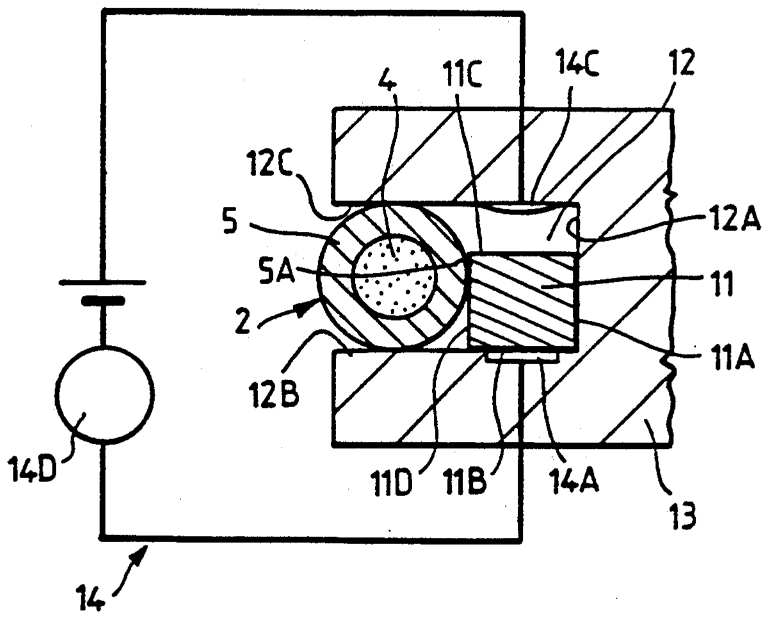
FIG. 3 is a transverse cross section along the line III—III of FIG. 2.

More particularly, as FIGS. 2 and 3 show, each element 10, in this embodiment, is in the form of a strip 11 having a polygonal, for example rectangular, transverse cross section. These figures show that the strip 11, made from a shape-memory alloy, is parallelepipedal and occupies, in this case, a neutral position corresponding to one of its two stable states and for which the subsequent operation cannot be triggered, since the cord 2 has not been ignited.

In this particular embodiment, the cord 2 and the strips 11, which are successively attached to it in a spaced-apart manner, are housed advantageously in a recess 12 made in a structural part 13 and having a U-shaped transverse cross section. Thus, each strip 11, then in the neutral position and straight, is engaged in the recess 12 of the part, in order to be applied, by two of its longitudinal 11A and perpendicular 11B faces, respectively against the bottom 12A and the corresponding branch 12B of the U-shaped recess. It will also be noted in FIGS. 2 and 3 that the longitudinal face 11C of the illustrated strip 11, opposite its face 11B in contact with the branch 12B, is at a certain distance from the facing branch 12C of said recess, the distance separating the faces 11B and 11C of each of the strips being less than the width of the U-shaped recess 12 separating its branches.

The pyrotechnic cord 2 is then inserted between the branches 12B and 12C of the recess 12, so that the external periphery 5A of its sheath 5 is applied against the longitudinal face 11D of the strips, opposite that face 11A bearing against the bottom 12A of the recess. Thus, the contact between the cord and each strip is perfectly established, which promotes the heat transfer toward the strips when the cord is ignited. The external diameter of the cord 2 is preferably at least equal to the width of the recess 12, in order to retain it in the latter. Furthermore, the deformable character of the cord, inherent to the nature of its sheath, enables it to be easily fitted to any type of desired duct provided on said structural part and imposed in this case by the recess.

In addition, in order to actuate a subsequent operation by means of each strip, use is made in this embodiment example of the device 1 of electrical contact means 14 which are represented diagrammatically in FIGS. 2 to 5. Thus, two electrical contacts 14A and 14B are provided on the branch 12B of the recess, on which contacts rest the respective ends 11B1 and 11B2 of the longitudinal face 11B of the illustrated strip. Another electrical contact 14C is itself provided on the opposite branch 12C of the recess and it is substantially located facing and in the middle of the longitudinal face 11C of the strip, as shown especially in FIG. 2. These contacts 14A, 14B, 14C form part of an electrical circuit defining the means 14, with which circuit there is associated a member 14D, such as a motor, intended to actuate a subsequent operation, symbolized by the arrow F in FIGS. 2 and 4.

It will be noted in FIGS. 2 and 3 that, in the neutral position occupied by the strip 11 and corresponding to one of its two stable states, the electrical connection between the contacts is not established, since the strip has a straight configuration, its corresponding longitudinal face 11C then being at some distance from the branch 12C of said recess, to which branch the electrical contact 14C is fixed.

Figure 4:
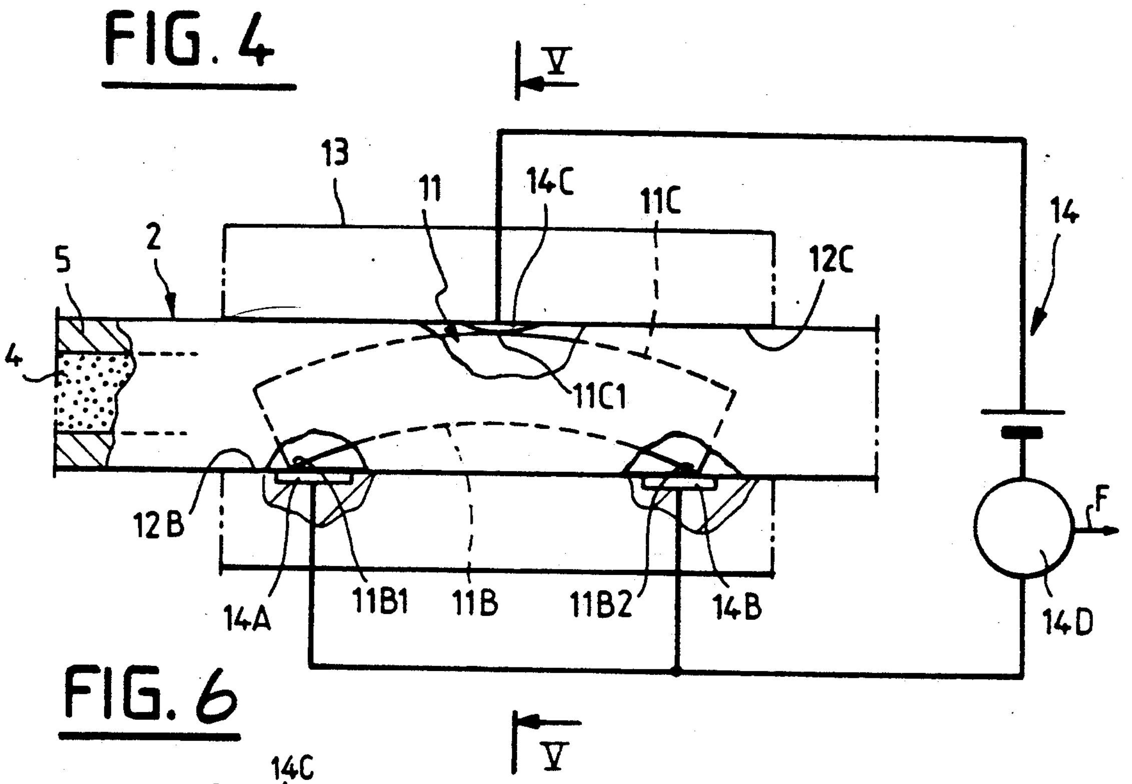
FIG. 4 is a view similar to FIG. 2, but in which the element of the device occupies an active position authorizing the actuation of a subsequent operation.
Figure 5:
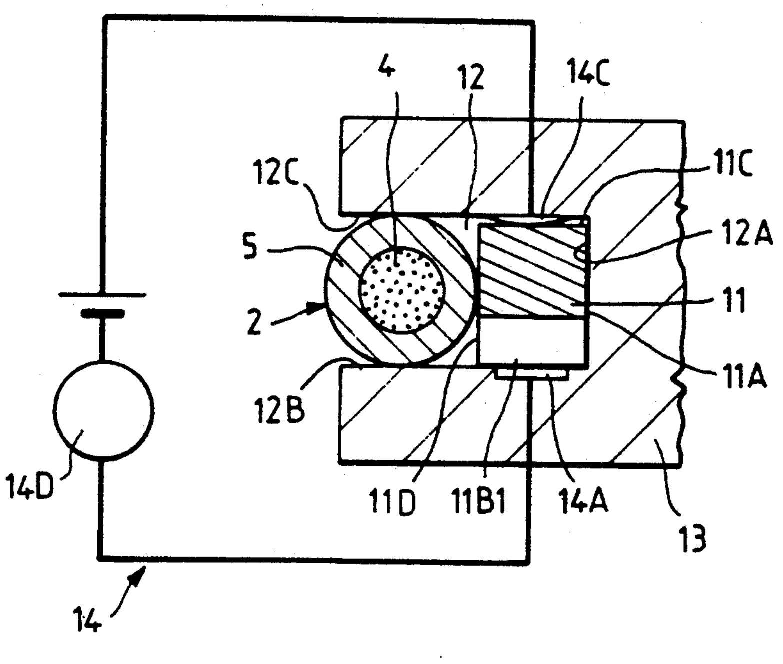
FIG. 5 is a transverse cross section along the line V—V of FIG. 4.

On the other hand, in FIGS. 4 and 5, it may be seen that, in the active position of the strip, corresponding to the other of its two stable states, the electrical connection between the contacts is established since the strip has an arched configuration, its face 11C being applied against the contact 14C.

Figure 6:
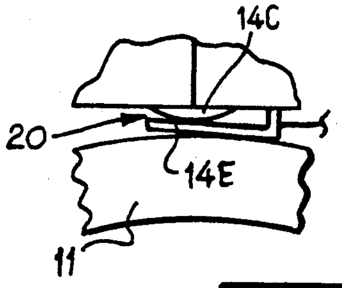
FIG. 6 is a detail of a portion of FIG. 4 illustrating an alternative embodiment of the invention, in which the deformable element actuates a mechanical device to allow actuation of a subsequent operation.

FIG. 6 illustrates an alternative embodiment of the invention in which deformable strip 11 actuates mechanical switch 20 to cause contacts 14C and 14E to close, thus permitting a subsequent operation to be energized by means of a control circuit not shown.

In order to obtain such a strip from a shape-memory metallic alloy, the procedure, for example, is as follows. The strip 11 is first of all produced in its shape represented especially in FIG. 4. This shape is acquired while the crystalline structure constituting the strip is in its austenitic phase corresponding to its first stable state. The strip thus produced has an arched shape, of rectangular cross section. Next, the strip is cooled to a temperature such that its crystalline structure is in the martensitic phase and the strip is deformed in order to make it adopt its parallelepipedal configuration represented in FIG. 2. At this moment, the strip 11 is in its second stable state corresponding to its neutral position. After returning to ambient temperature, this new shape of the strip is acquired and its mechanical characteristics restored.

The operating of the successive-actuation device 1 is as follows. After firing the slow-fusing composition 4 of the pyrotechnic cord 2 by means of the triggering means 3, the combustion front propagates progressively within the sheath 5 of said cord at a speed of several millimeters per second, which depends on the chemical nature of the composition 4. This combustion releases heat whose temperature reached is sufficiently high to melt the metal sheath 5 made from tin or from lead, the melting point of which is relatively low.

When the combustion front of said pyrotechnic cord arrives in the region of the first strip 11, with which the longitudinal face 11D is in contact, its temperature increases, in turn, above its transition temperature because of the heat released and generated by the combustion o the cord. As a result, the strip passes from its martensitic state, corresponding to its second stable state, toward its austenitic state, corresponding to its first stable state, for which the strip has an arched configuration. This deformation produces mechanical work which is used in this example for closing the electrical circuit 14 by establishing the electrical connection between the contacts 14A, 14B, on which contacts rest the ends 11B1 and 11B2 of the face 11B of the strip, and the contact 14C, against which bears the central zone 11C1 of the face 11C of the strip 11 which is then arched, in the active position. At this moment, the motor 14D of said circuit 14 can trigger the subsequent operation F. Moreover, the deformation of the strip 11 could be used for releasing, for example, a mechanical device moved by a spring or the like.

Simultaneously with the triggering of this electrical, mechanical or other type of operation, the combustion front of the pyrotechnic cord 2 continues its progression in order to cause successively the change of state of the downstream strips 11, which are spaced apart with respect to each other, along the cord, and each of which can actuate, by means of the electrical contact means 14, a specific operation.

Thanks to the device of the invention, a chain reaction is consequently produced enabling, by using a pyrotechnic cord triggered by a single electrical command, a plurality of subsequent operations to be actuated successively. Of course, the interval of time between the instant of ignition of the pyrotechnic cord and the actuation of the subsequent operation generated by the change of state of one of the strips depends on the nature of the fusing chemical composition employed and on the cord length to be used as far as this strip.

Although, in the above representations, the strips 11 have been designed arranged alongside or on the pyrotechnic cord 2, it goes without saying that, as a variant, said strips 11 could be hollow and traversed by said cord.

I claim:

1. A successive-actuation device, of the type including at least one pyrotechnic cord (2) and mean (3) for triggering the operation of said pyrotechnic cord, wherein it comprises at least one element (10) made from a shape-memory alloy having two stable states and disposed along said pyrotechnic cord (2), said element being capable of actuating a subsequent operation when it passes from one of its two stable states, for which the element occupies a neutral position, toward its other stable state for which it occupies an active position, under the action of the heat released by said pyrotechnic cord (2) following the triggering of the latter.

2. The device as claimed in claim 1, wherein said element (10) made from a shape-memory alloy acts, when it passes toward its stable state corresponding to its active position, on electrical contact means (14) which allow the actuation of the subsequent operation.

3. The device as claimed in claim 1, wherein said element (10) made from a shape-memory alloy acts, when it passes toward its stable state corresponding to its active position, on mechanical means which allow the actuation of the subsequent operation.

4. The device as claimed in claim 1, wherein a plurality of elements (10) made from shape-memory alloy are disposed, in a spaced-apart manner, along said pyrotechnic cord (2), in order for each to actuate a subsequent operation, when they pass successively toward their active position under the action of heat released progressively by said pyrotechnic cord (2).

5. The device as claimed in claim 1, wherein said means (3) for triggering said pyrotechnic cord comprise an electrical power supply (9) connected to a chemical priming composition (6) in contact with a chemical heating composition (7) connected to said pyrotechnic cord (2).

6. The device as claimed in claim 1, wherein said pyrotechnic cord (2) is of the delay type and is constituted by a slow-fusing chemical composition (4) contained in a metal sheath (5).

7. The device as claimed in claim 1, wherein said element (10) is in the form of a strip (11) in contact with said pyrotechnic cord (2).

8. The device as claimed in claim 7, wherein the transverse cross section of said strip (11) is polygonal.

9. The device as claimed in claim 1, wherein said pyrotechnic cord (2) is housed in a recess (12) of a part (13), in which recess said element (10) made from shape-memory alloy is also arranged.

10. The device as claimed in claim 9, wherein said element (10) is disposed between the bottom (12A) of said recess (12) and said pyrotechnic cord (2).

* * * * *